United States Patent
Fischer et al.

(10) Patent No.: US 7,929,654 B2
(45) Date of Patent: Apr. 19, 2011

(54) DATA SAMPLING CIRCUIT AND METHOD FOR CLOCK AND DATA RECOVERY

(75) Inventors: Wilhelm C. Fischer, Berkeley Heights, NJ (US); David A. Inglis, Holmdel, NJ (US); Yusuke Ota, Mountain Lakes, NJ (US)

(73) Assignee: Zenko Technologies, Inc., Middlesex, NJ (US)

( * ) Notice: Subject to any disclaimer, the term of this patent is extended or adjusted under 35 U.S.C. 154(b) by 901 days.

(21) Appl. No.: 11/897,404

(22) Filed: Aug. 30, 2007

(65) Prior Publication Data

US 2009/0060107 A1  Mar. 5, 2009

(51) Int. Cl.
*H04L 7/00* (2006.01)
*H04L 27/22* (2006.01)
*H04L 7/02* (2006.01)

(52) U.S. Cl. ......... 375/355; 375/333; 375/359; 375/368

(58) Field of Classification Search ................. 375/282, 375/333, 355, 359, 361, 365, 368, 371
See application file for complete search history.

(56) References Cited

U.S. PATENT DOCUMENTS

| 5,164,966 | A | 11/1992 | Hershberger | 375/359 |
|---|---|---|---|---|
| 6,122,335 | A * | 9/2000 | Colella et al. | 375/355 |
| 6,304,622 | B1 | 10/2001 | Conradi et al. | 375/354 |
| 6,526,109 | B1 | 2/2003 | Chang et al. | 375/371 |
| 6,545,507 | B1 | 4/2003 | Goller | 326/93 |
| 6,567,484 | B1 * | 5/2003 | Hirota et al. | 375/355 |
| 7,069,481 | B2 | 6/2006 | Lee et al. | 714/707 |
| 7,099,400 | B2 | 8/2006 | Yang et al. | 375/287 |
| 7,099,424 | B1 | 8/2006 | Chang et al. | 375/370 |
| 7,340,021 | B1 * | 3/2008 | Churchill et al. | 375/355 |
| 2002/0090044 | A1 | 7/2002 | Lee et al. | 385/373 |
| 2003/0142740 | A1 | 7/2003 | Haunstein et al. | 375/233 |
| 2003/0174766 | A1 | 9/2003 | Don et al. | 375/244 |
| 2004/0022339 | A1 | 2/2004 | Nakao | 375/376 |
| 2004/0114632 | A1 | 6/2004 | Yuuki et al. | 370/503 |
| 2004/0120352 | A1 | 6/2004 | Jungerman | 370/503 |

(Continued)

FOREIGN PATENT DOCUMENTS

| KR | 2001/0000854 | 1/2001 |
|---|---|---|
| KR | 2001/0051772 | 3/2003 |

OTHER PUBLICATIONS

P. S. Han and W. Y. Choi, "*1 Gbps Gated-oscillator Burst Mode CDR with Half-rate Clock Recovery*," Journal of Semiconductor Technology and Science, vol. 4, No. 4, Dec. 2004.

(Continued)

*Primary Examiner* — Betsy L Deppe
(74) *Attorney, Agent, or Firm* — Ernest D. Buff; Ernest D. Buff & Assoc. LLC; Gordon E. Fish

(57) ABSTRACT

A clock and data recovery circuit and method are used in a digital data communications system. The circuit and method are effectively employed for high speed, burst-mode transmission and allow rapid recovery of the clock and data signals without the need for an extended header, and notwithstanding the presence of substantial timing jitter. The method adaptively selects from among three delay times for the extraction of data by identifying a frequently recurring incoming pattern in the incoming data. The delay time is selected in a manner that insures that the same pattern is present in the reconstructed, resynchronized output data.

23 Claims, 6 Drawing Sheets

U.S. PATENT DOCUMENTS

| | | | |
|---|---|---|---|
| 2004/0153681 A1 | 8/2004 | Cao | 713/400 |
| 2005/0015638 A1 | 1/2005 | Zhang | 713/600 |
| 2005/0046456 A1 | 3/2005 | D'Haene et al. | 327/165 |
| 2005/0135527 A1 | 6/2005 | Masui et al. | 375/355 |
| 2005/0238093 A1 | 10/2005 | Payne et al. | 375/244 |
| 2006/0031701 A1 | 2/2006 | Nam et al. | 713/500 |
| 2006/0062327 A1 | 3/2006 | Dally | 375/316 |
| 2007/0064848 A1* | 3/2007 | Desai | 375/355 |
| 2008/0137789 A1 | 6/2008 | Cranford et al. | 375/354 |
| 2008/0187080 A1 | 8/2008 | Lee et al. | 375/355 |

OTHER PUBLICATIONS

"*HFTA-07.0: Precision reference clock usage in clock and data recovery circuits*", Maxim Integrated Products, App. Note 1925, Mar. 13, 2003, p. 1-4, found at http://pdfserv.maxim-ic.com/en/an/AN1925.pdf.

R. Bhatti et al., "*2 Gbps SerDes design based on IBM Cu-11 (130nm) standard cell technology*", ACM Great Lakes Symposium on VLSI, 2006, p. 198-203.

* cited by examiner

DATA SAMPLING CIRCUIT AND METHOD FOR CLOCK AND DATA RECOVERY

BACKGROUND OF THE INVENTION

1. Field of the Invention

The present invention relates to a data communications circuit; and more particularly, to a circuit and method for clock and data recovery in high speed digital communications via optical fiber or wire connection.

2. Description of the Prior Art

Present telecommunications and computer systems require the high data-rate transmission of digital information between different circuits. These circuits may be in close proximity, such as within a single equipment cabinet, or they may be separated by very long distances. Data may be transmitted either by electrical impulses carried using a wired connection such as a coaxial cable or a conductive trace on a circuit board or as light pulses transmitted through optical fibers. Light pulses are generally generated by laser diodes (LD's) or light emitting diodes (LED's) and injected into long fibers of glass or polymeric materials. The fibers are capable of propagating the light with extremely low losses and acceptably low dispersion, whereby information embodied in the modulation pattern may be conveyed. The light that emerges from the other end of the fiber can be detected and reconverted into electronic signals that reproduce the original signal. In most cases, a single connection is used in both optical and electrical systems and there is no provision for transmitting a separate clock signal. The increasingly high data rates now being used in digital systems impose stringent requirements if an acceptably low bit error rate (BER) is to be attained.

Transmission of digital data, whether done electrically or optically, generally employs one of two formats: return-to-zero (RZ) format or non-return-to-zero (NRZ) format. In both formats, a specific time interval is allocated for each bit. In RZ format, every binary 1 is represented by a full transition (low→high→low) between signal levels, and every binary 0 represented by the absence of any pulse transition. In NRZ format, each binary 1 or 0 bit is represented by a signal level that remains high or low, respectively, during the bit's entire time period, which is given by the reciprocal of the data rate. Transitions (high→low or low→high) occur only when successive bits are different; there are no transitions between two successive like bits. NRZ format is generally preferred, because it inherently permits a greater data rate (about double) for a given frequency bandwidth in the communications channel.

The timing of the bits of digital data transmitted in either RZ or NRZ format is referenced to a system clock at the origin. The timing ordinarily is not transmitted downstream using a separate clock signal, so it must be recovered at the destination in order to properly interpret the received bit stream. The process of recovering the clock and data is typically termed clock data recovery (CDR). NRZ format typically presents a greater difficulty, because fewer transitions are available from which to recover the clock. Suitable CDR methods are clearly essential for digital communications circuits and systems for a wide variety of systems for data transmission, whether over short distances within a piece of equipment (e.g. communication with a disk drive of a computer system) or for extended distances for telecommunications or computer networking.

The problem of clock recovery is particularly challenging in high-speed, burst mode communications, by which is meant a situation in which a relatively large amount of information is transmitted during a transmission interval, followed by a quiescent interval of indeterminate duration. The desirability of burst-mode transmission arises in many data communications situations. While certain known CDR circuits function acceptably well with an extended, if not continuous, data stream, burst-mode transmission presents far greater difficulties. The timing signal needs to be established quickly as each burst begins, and it must be re-acquired for each subsequent burst.

Many conventional CDR circuits employ a phase lock loop (PLL) circuit operating on the incoming data to provide a local clock signal synchronized to the rate of the incoming data. One such PLL CDR circuit is depicted by FIG. 1. However, PLL circuits, including that of FIG. 1, ordinarily require a relatively long time to settle before they are properly synchronized. Accurate clock recovery and data extraction are only possible after that synchronization is achieved.

A further difficulty is that the signals encountered in data communications are not simple sine waves or modulated sine waves, in which there is substantial harmonic content at the base frequency. Although synchronized to an underlying clock that is provided at the source and has a well-defined base frequency, the data stream is an apparently random signal. Little of the actual spectral energy density in the data stream is at the base frequency. Instead, a data stream, particularly one in NRZ format, has a relatively broadband spectrum, in contrast to the relatively narrow bandwidth of the data commonly encountered by PLLs in synthesizers, demodulators, and modulators.

The settling time required for a conventional PLL-based CDR circuit is frequently accommodated by appending a relatively long header to the essential data. The header provides enough time for the CDR circuit to settle, after which it can reliably process the incoming data stream.

The addition of a header of such length has little impact on overall transmission efficiency for data provided in extended transmissions. On the other hand, in burst mode, if the required header is an appreciable fraction of the overall amount of actual data within each burst, transmission overhead increases and effective throughput is reduced. In many situations, such as computer networking, a single communications line is appointed to service multiple recipients of data from different sources. Over a long time, each recipient often requires only a small portion of the total available bandwidth, but still desires frequent and data-intensive rapid responses for short, randomly occurring periods. In such instances, it is highly desirable to minimize the amount of unneeded transmission overhead to maximize the effective overall capacity of the data line.

One common data transfer protocol using high-speed, burst mode communications is the GPON system, which operates with a data rate tightly controlled to be 1.25 gigabits per second (Gbps). A typical PLL CDR circuit used with a 1.25 Gbps system requires a time on the order of 25-500 ns to settle, depending on the particular design of the system used.

As a result of continuing increases in demands for high bandwidth digital data transmission, especially for burst-mode communications, there remains a desire and need for improved data communications circuits, notably including improved clock data recovery circuits.

SUMMARY OF THE INVENTION

In one aspect, the present invention provides a circuit for recovering clock and data signals from a digital input signal carried in a digital communications system. Although preferably designed for an input signal having a preselected data rate of 1.25 Gbps, the circuit in other implementations operates at other higher or lower data rates. The circuit comprises: (i) a clock means for generating a recovered clock signal having a recovered clock frequency synchronized to the appointed data rate; (ii) initialization means for setting a delay select code signifying a delay interval of one of an intermediate, early, or late delay interval, the initialization means setting the delay select code to a preselected one of the delay intervals at the startup of the circuit; (iii) a data sampling bank receiving the input signal and comprising delay means for delaying the input signal to form delayed signals in early, intermediate, and late signal channels, the bank being triggered by the recovered clock; (iv) a pattern detection means for detecting occurrences of a preselected bit pattern in the input signal and generating a select pulse in response to each detection of the preselected bit pattern; (v) a selection means connected to the pattern detection means and the data sampling bank and operative in response to each receipt of the select pulse to update the delay select code; (vi) a multiplexer receiving the delay select code from the selection means and signals from the data sampling bank in the early, intermediate, and late signal channels and outputting an optimum delayed signal chosen from among the signals in the early, intermediate, and late signal channels according to the delay select code; and (vii) an output flip-flop receiving the optimum delayed signal from the multiplexer and being clocked by the recovered clock signal, the output flip-flop thereby forming the recovered data signal in synchrony with the recovered clock signal. The preselected bit pattern consists of a sequence of a preselected initial bit, a preselected multi-bit timing indication pattern having an indication number of bits, and a preselected final bit. The updating of the delay select code preserves the preselected bit pattern in the recovered data signal. The present invention also provides a data communications system employing the foregoing circuit.

Further provided is a method for recovering clock and data signals from a digital input signal carried in a digital communications system. The method is preferably implemented in a signal having a preselected data rate of 1.25 Gbps, but may also be practiced in systems operating at higher or lower data rates. The method comprises: (i) providing a recovered clock signal having a recovered clock frequency synchronized to the data rate; (ii) defining a delay select code signifying a delay interval of one of an intermediate, early, or late delay interval and initializing the delay select code of a preselected one of the delay intervals at the startup of the method; (iii) delaying the input signal by each of the early, intermediate, and late delay intervals to form respective early, intermediate, and late delayed signals; (iv) detecting in one of the delayed signals occurrences of a preselected bit pattern; (v) selecting from among the early, intermediate, and late delayed signals an optimum delayed signal, the selection being chosen according to the delay select code; and (vi) retiming the optimum delayed signal to form the recovered data signal in synchrony with the recovered clock signal. The preselected bit pattern consists of a sequence of a preselected initial bit, a preselected multi-bit timing indication pattern having an indication number of bits, and a preselected final bit. Updating of the delay select code preserves the preselected bit pattern in the recovered data signal.

The present circuit and method are beneficially employed in a digital data communications system, particularly one employed for transmitting information in burst mode at high data rates. The system is readily and economically implemented. The use of a locally generated clock signal and alternative, adaptively selected and updated delay times, permits the circuit to accurately reconstruct and retime an incoming data stream in synchrony with a recovered clock. The acquisition of the signal and selection of an appropriate delay time are done rapidly, permitting burst-mode signals to be processed without need for an extended header block that reduces effective bandwidth.

Preferably, the system is implemented using detection of a bit pattern consisting of four alternating bits, i.e. a 0101 or 1010 bit pattern. Detection of a 0101 sequence is preferred, but the circuit and method may also be implemented for operation based on the complementary 1010 sequence. Suitable choice of the delay time permits the circuit and method to accommodate much larger timing jitter in the incoming data without unacceptable bit error rates than is possible using existing high data rate clock and data recovery circuits adapted for burst-mode applications.

BRIEF DESCRIPTION OF THE DRAWINGS

The invention will be more fully understood and further advantages will become apparent when reference is had to the following detailed description of the various embodiments of the invention and the accompanying drawings, wherein like reference numerals denote similar elements throughout the several views, and in which.

DETAILED DESCRIPTION OF THE INVENTION

In one aspect of the invention, there is provided a circuit and method for recovering clock and data signals carried in a digital communications system to a receiving location. The data may be transmitted by either electrical or optical techniques. The circuit operates on a digital input signal in the form of electrical impulses. When the circuit is used in conjunction with an optical system, the propagating light pulses are converted using any converter known in the optical fiber transmission art to provide corresponding electrical impulses. The circuit may be used for continuous data streams, but is particularly useful in connection with burst-mode communications.

Figure 2:
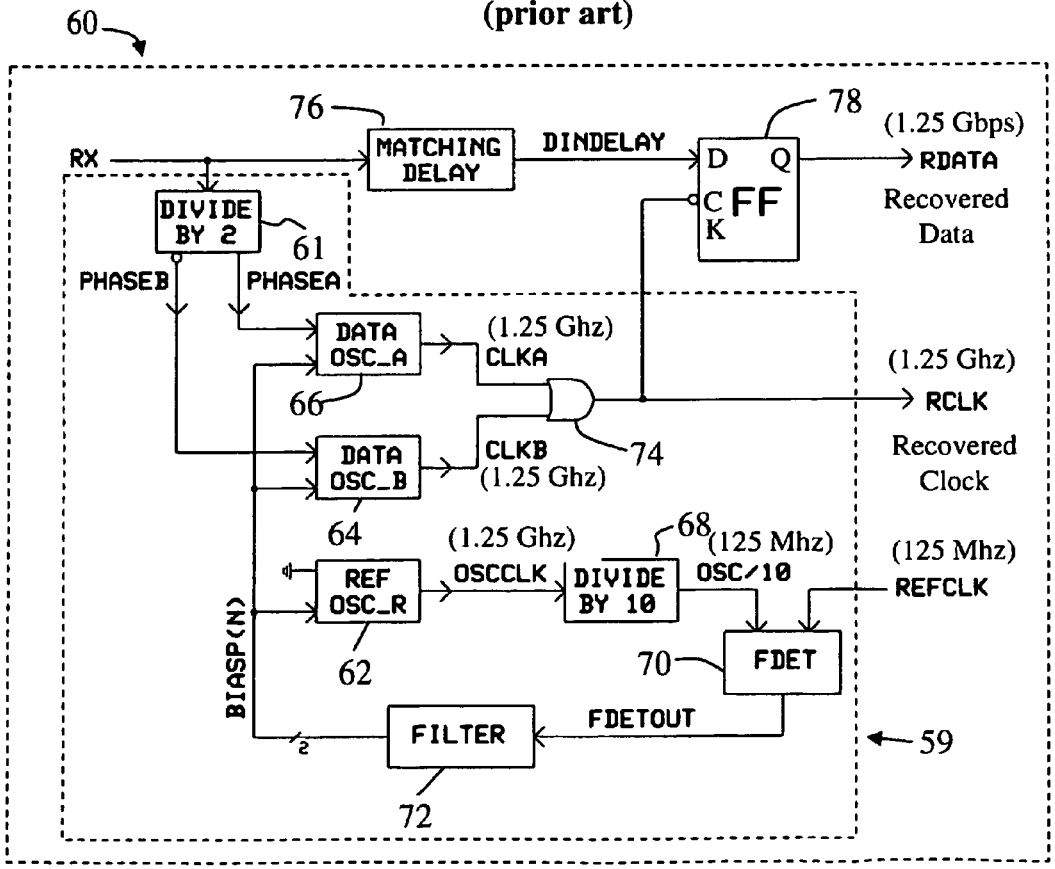
FIG. 2 is a block schematic diagram showing a prior art CDR circuit useful in processing burst-mode data at a 1.25 Gbps data rate.

Referring now to FIG. 2, there is depicted in block diagram form a known CDR circuit 60 usable for burst-mode communications. The circuit 60 acts to accepts an incoming NRZ-formatted digital signal denoted as data RX, from which is obtained a regularized, recovered data stream RDATA and a recovered clock RCLK. The RDATA stream is synchronized to RCLK, by which is meant that the bit transitions in the data coincide with transitions in the RCLK signal. Circuit 60 includes a clock recovery section 59 that employs three matched, voltage-controlled oscillators. DATA OSC_A 66 and DATA OSC_B 64 are used in processing the input data, while REF OSC_R 62 is used to generate a well-stabilized, local reference clock OSCCLK having a frequency matching the input data rate. Typically, specifications require the locally generated clock rate to match the actual incoming data rate to within a few parts per million to ensure satisfactory data recovery.

Clock recovery section 59 provides a reference channel based on a locally generated reference clock signal REFCLK having a frequency subharmonically related to the incoming data rate. A phase lock loop locks the reference oscillator frequency OSCCLK to a preselected multiple of the frequency of REFCLK. In the implementation shown, OSCCLK is locked to 1.25 GHz, ten times the frequency of REFCLK (125 MHz). A feedback loop is established using phase/frequency detection circuit FDET 70 and a lowpass FILTER 72. FDET 70 compares OSCCLK (divided by 10 by circuit 68) with REFCLK (running at a local frequency chosen to be one-tenth the base data rate) to generate an output FDETOUT that is filtered by FILTER 72 to produce DC bias voltages BIASN and BIASP used to control all three oscillator circuits. The oscillators must be carefully matched, so that application of identical input control voltages BIASN and BIASP to all three oscillators results in outputs at substantially a common frequency. The matching of the oscillators must be sufficiently close to maintain synchronization of the recovered clock even in situations in which the incoming data stream includes long strings of consecutive 0 or 1 bits, during which there is no opportunity for any adjustment of the respective clocks or delay times. For example, in some burst-mode applications, the incoming data may have as many as 72 consecutive 0 or 1 bits in the data stream. During such a string, generation of the recovered clock relies on one or the other of DATA OSC_A 66 and DATA OSC_B 64, so that the outputs of these respective oscillators must remain sufficiently well synchronized to avoid any timing errors in recovered clock RCLK. This sets stringent limits on the oscillator matching. Suitable methods are known in the art that permit close matching of different sub-circuits during typical integrated circuit fabrication, such as by CMOS processing.

Figure 1:
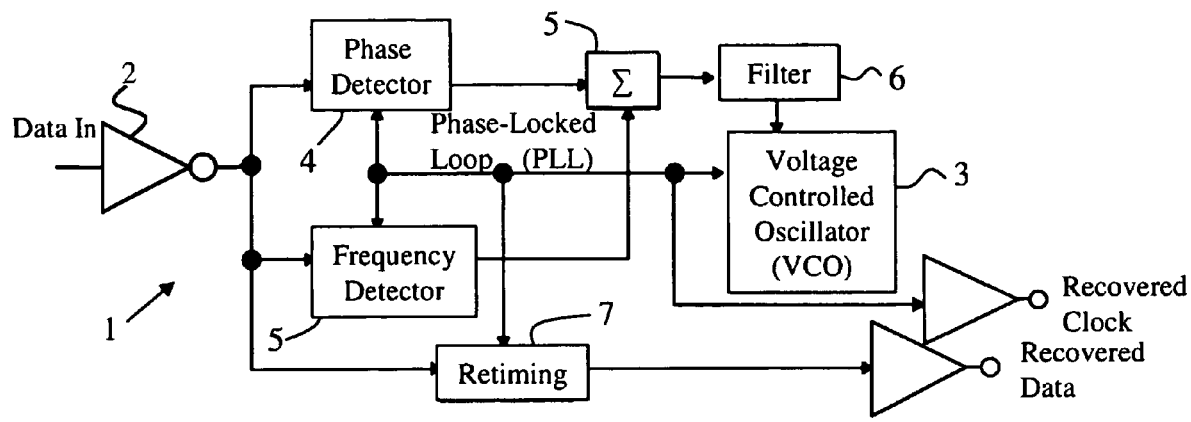
FIG. 1 is a block schematic diagram showing a prior art CDR circuit that uses a PLL to recover a clock signal from an incoming digital data signal.

In contrast to the conventional PLL-based CDR circuit 1 of FIG. 1, in which the PLL locks frequency directly to the incoming data, the FIG. 2 circuit 60 locks to a locally generated clock. The operation of the circuit of FIG. 2 is further made apparent by reference to the timing diagram of FIG. 3. A typical input signal RX clocks a Divide-by-2 flip-flop circuit 61 to produce complementary phase signals PHASEA and PHASEB, which respectively enable DATA OSC_A 66 and DATA OSC_B 64. A rising edge of RX data (indicated by the arrow "X") turns OSC_A 66 on and turns OSC_B 64 off, causing OSC_A 66 to generate pulses in the CLKA signal until the next rising edge of data turns off OSC_A 66 and turns on OSC_B 64, which then produces CLKB pulses. The propagation delays through the divide-by-two flip-flop 61 and oscillators 64, 66 produce a delayed rising edge in the CLKA and CLKB signals, as representatively indicated by arrow "Y." CLKA and CLKB are OR'ed by gate 74 to produce recovered clock RCLK, which is a square wave having a frequency corresponding to the bit rate of the RX data and approximately a 50% duty cycle. A suitably delayed RX signal (DINDELAY) is input to a D-type flip-flop circuit 78 clocked by RCLK. The output of flip-flop 78 regularizes the incoming data RX and provides recovered data RDATA in synchrony with RCLK. The delay time produced by MATCHING DELAY 76 is selected based on the input data rate and the typical propagation and switching delays in the various circuits. Preferably, the delay is chosen so that the flip-flop clocking, based on the falling edge of RCLK, occurs at or near the midpoint of the data period in the DINDELAY signal. The resulting transitions in recovered data RDATA coincide with falling edges in recovered clock RCLK, as representatively indicated by arrow "Z." In the implementation shown, the input data rate is 1.25 Gbps, so each data bit occupies a period of 800 ps. MATCHING DELAY 76 is preferably chosen such that the RCLK rising edge occurs at a time nominally about 400 ps after a rising edge in the RX stream, and every 800 ps thereafter.

Figure 3:
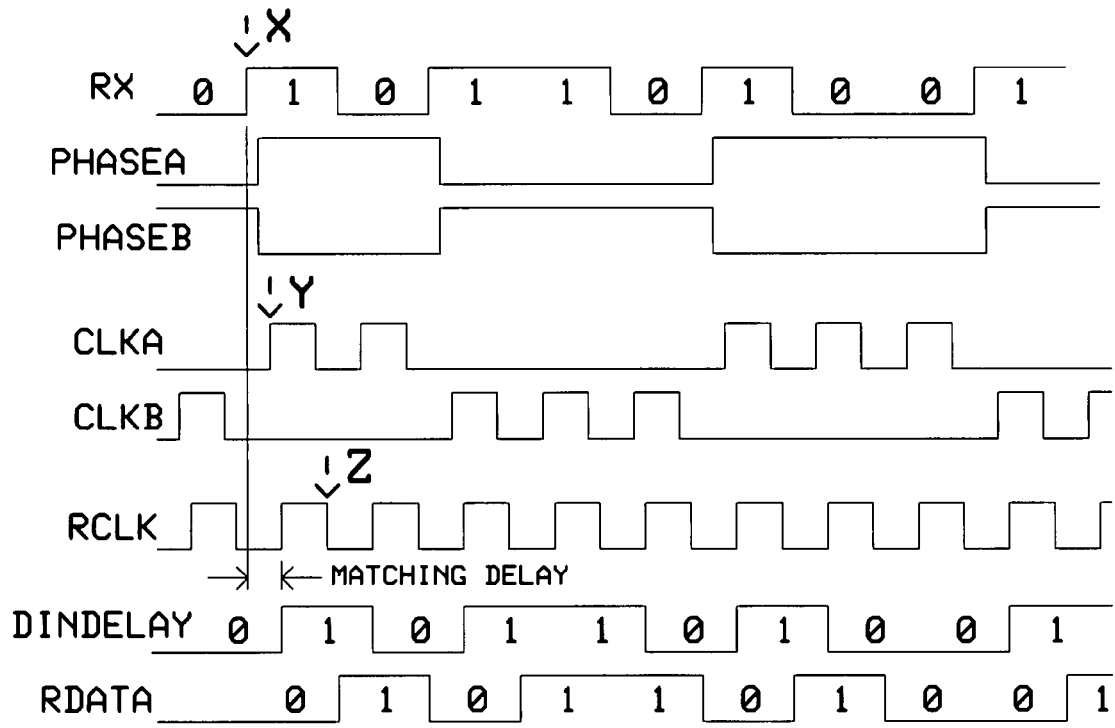
FIG. 3 is a timing diagram showing digital signals associated with the circuit of FIG. 2.

In the idealized situation depicted by the FIG. 3, the foregoing circuit and timing provides sampling of the RX signal optimally chosen to be at the mid-point of each incoming data bit. However, in practice, even signals that are perfectly formed as rectangular pulses in the transmitter are never received in pristine condition. Transmission inevitably subjects the pulses to distortion in both timing and amplitude, so that careful reconstruction of the original signal must ordinarily be done at the receiving end to assure the integrity and accuracy of the received data.

Asynchronously transmitted signals are particularly vulnerable to these distortions. That is to say, the value (0/1) of each incoming bit is assumed to be correctly determined by interrogating the data line at a time set at the receiving end in accordance with a recovered clock provided by the CDR circuit. If the incoming signal level at that putative interrogation time does not accurately reflect the intended value, a bit error results.

Time jitter is an especially troublesome source of bit error, particularly in burst mode transmission. Jitter in digital systems is often represented by a so-called "eye diagram," also known as an "eye pattern," which is a commonly used representation of the departure of actual digital signals from ideal form. The eye diagram is generally portrayed as an oscilloscope display in which a digital data signal from a receiver is repetitively sampled and applied to the vertical input, while the data rate is used to trigger the horizontal time sweep. The time base is adjusted to display nominally one bit period. The name is generally descriptive of the appearance of the resulting oscilloscope locus. For many commonly used types of coding, the pattern looks like a series of eyes between a pair of rails.

Figure 4:
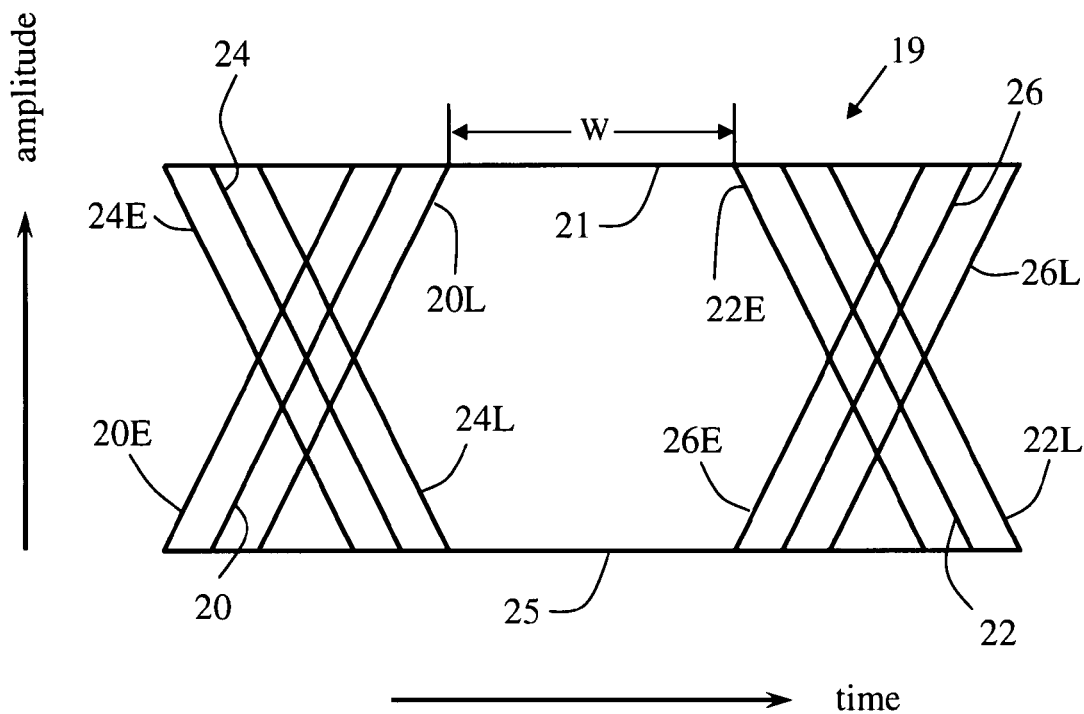
FIG. 4 is a schematic depiction of an eye diagram representing transitions in a digital data stream.

Referring now to FIG. 4, there is depicted generally at 19 a prototypical eye diagram. During the nominal time period of each bit, the signal may be constantly high or low (logical 1 or 0), or it may have a rising or falling edge, at either the beginning or end of each time slice (or both). In particular, the period ideally may include a low→high→low (0→1→0) transition represented by an initial rising edge 20, a high level 21, and a final falling edge 22. Alternatively, there may ideally be a high→low→high (1→0→1) transition with an initial falling edge 24, a low level 25, and a final rising edge 26. The slopes of the initial and final edges reflect the rise and fall times of the digital circuitry. However, in practice, the rising and falling edges at both the beginning and end of each period may occur earlier or later than nominal. Initial rising edge 20 may occur earlier or later, as shown at 20E, 20L. Initial falling edge 24 may also occur earlier or later, at 24E, 24L. Similarly, advanced or retarded edges may occur at the end of each period, 26E, 26L, 22E, 22L. Any variation from the nominal transition times depicted by beginning edges 20, 24 and ending edges 22, 26 represents time jitter. While FIG. 4 shows only a few transitions for the sake of clarity, it is to be understood that an actual data stream would produce an eye diagram with a dense distribution of jitter times, instead of the single early and late transitions shown. Many sources may contribute to jitter, including noise inherent in an optical transmitter and receiver. Although not shown in the FIG. 4 diagram, it will also be understood that overshoot/undershoot and some variation in the amplitude (e.g. voltage or light intensity) corresponding to the low and high logic states are also seen, leading to further possible errors.

Several important system performance measures relating to both signal amplitude and timing can be derived by analyzing the eye diagram. Signals that are too long, too short, or poorly synchronized with the system clock, or have slow high/low transitions are apparent on the left and right sides of the diagram. Signals that have too high or low amplitude, undershoot/overshoot, or excessive noise are manifest on the top and bottom of the eye diagram. An open, substantially rectangular eye pattern corresponds to minimal signal distortion. Distortion of the signal waveform due to intersymbol interference, jitter, and amplitude noise all effectively close the eye diagram. For example, the prototypical timing variations of the transitions in FIG. 4 narrow the eye diagram width. Other errors in timing synchronization and jitter critical to the performance of a CDR circuit are also readily discerned using an eye diagram.

In order to extract data reliably using a CDR circuit, sampling must be done within the opening defined by the locus of the eye diagram circumscribed by many superimposed transitions, i.e., within the time limit indicated by arrow "W" of FIG. 4. If sampling is done too early or too late, it is almost certain that some bits will be incorrectly represented. Alternatively stated, the eye opening defines the amount of jitter allowable in the incoming data stream without compromising the integrity of the data extracted from the input.

As noted hereinabove, prior art PLL-based CDR circuits using a PLL locked to the incoming data stream, such as that shown generally at 1 in FIG. 1, are able to cope with data having relatively large amounts of slowly-varying jitter. That is to say, the circuit is able to adjust the sampling point to accommodate transitions that are significantly earlier or later than nominal, provided the jitter changes at a rate that is sufficiently low to be accommodated by the time constant of the filter in the PLL feedback loop.

The FIG. 1 circuit relies on a PLL that locks the frequency of an internally generated clock directly to the incoming data stream. The PLL is implemented conventionally using a voltage controlled oscillator 3 driving phase detector 4 and frequency detector 5 that both operate on the incoming data signal after it is regenerated through inverter 2. Signals from the detectors are summed at summer circuit 5 and filtered using low pass filter 6 to close the loop. The PLL thereby provides a recovered clock signal used to retime the incoming data using flip-flop circuits in retiming circuit 7.

Typically, the FIG. 1 circuit is arranged to provide sampling at the mid-point of the period of each data bit. For example, in a system used with a 1.25 Gbps data rate, nominal sampling occurs at 400 ps after a bit edge (the middle of the 800 ps period) and at 800 ps increments thereafter. In some embodiments, PLL-based CDR circuits can accommodate sampling as early as 100 ps or as late as 700 ps from the nominally expected time of an edge. In other words, pulses that are as short as 200 ps or as long as 1400 ps may be accommodated without causing unacceptable bit error rates.

On the other hand, the burst-mode CDR circuit of FIG. 2 relies on a clock frequency that tracks a locally generated reference source REFCLK instead of the incoming data signal. The FIG. 2 circuit thus is able to accept an incoming signal without the need for an extended header to allow for PLL frequency acquisition, but at the cost of being far less tolerant of timing jitter. It is typically found that for an input data rate of 1.25 Gbps, data having a jitter of more than about 45% (corresponding to a 55% eye opening) cannot reliably be extracted.

In an aspect of the present invention, there is provided a CDR circuit that is capable of accurately processing burst-mode data having far more jitter than could be tolerated with the circuit of FIG. 2. For example, some implementations of the present circuit can accommodate jitter characterized with an eye opening of 30%. Preferably, a circuit, such as circuit 80 depicted by FIG. 5, permits adaptive selection from among a predetermined nominal, intermediate sampling time and alternative predetermined earlier or later sampling times. The additional sampling time options permit a considerable amount of jitter to be accommodated. Preferably, the selection of nominal, early, or late sampling is regularly updated and done automatically and algorithmically. The present CDR circuit is particularly useful in processing data in which a preselected data pattern (or signature) recurs frequently. Each occurrence of such a data pattern affords an opportunity for determining an optimal sampling time that preserves, in the recovered and resynchronized data stream, a preselected bit pattern detected in the incoming data stream.

Figure 5:
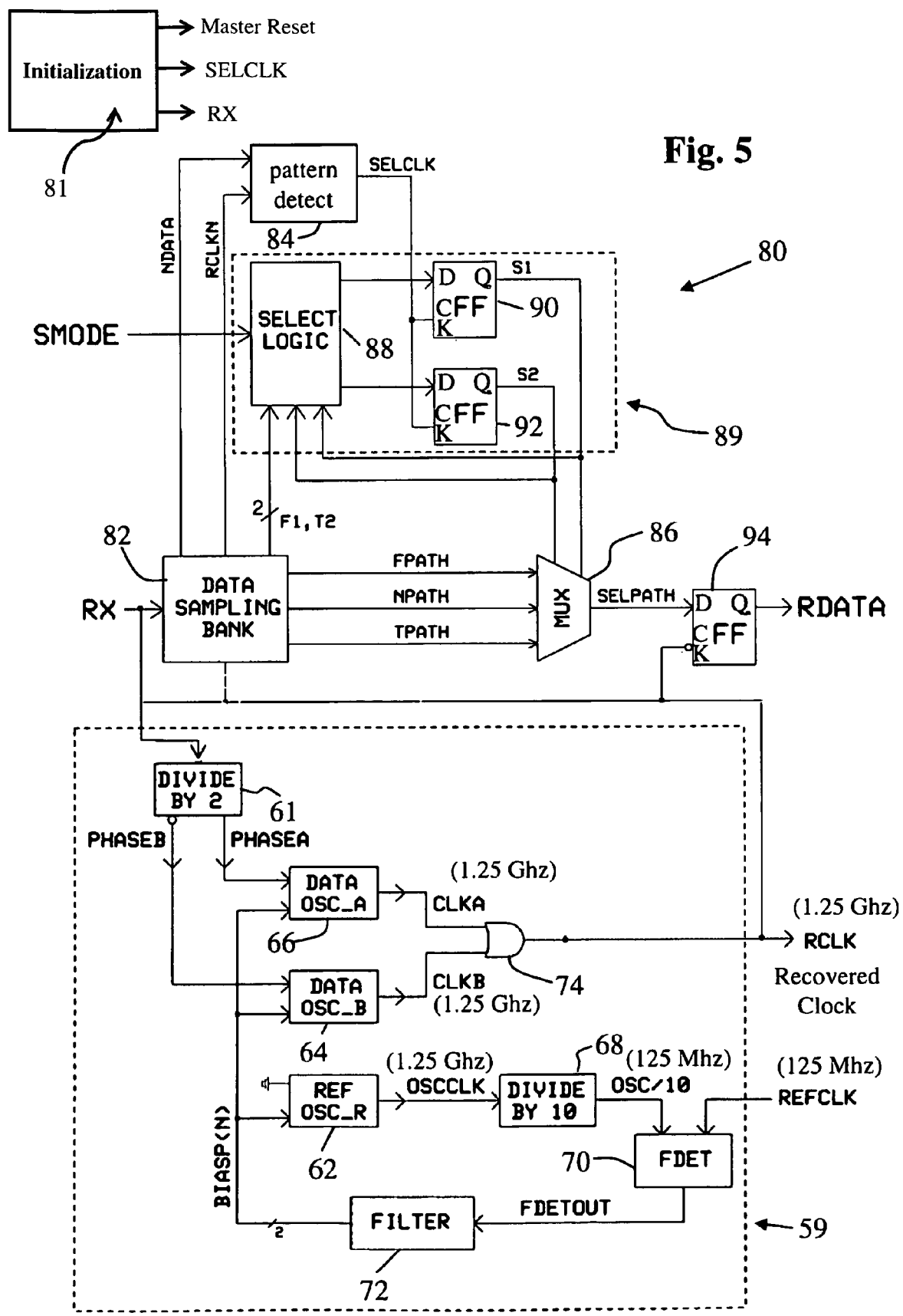
FIG. 5 is a block schematic diagram depicting a CDR circuit of the present invention.

An implementation of a CDR circuit useful in the present system is depicted generally at 80 in FIG. 5. This circuit includes a clock recovery section 59 similar to that employed in the FIG. 2 circuit, along with a delay selection section. One preferred type for the oscillator circuits in clock recovery section 59 is a current starved oscillator, though other types providing a suitable voltage-controlled output are also usable. The circuit depicted is designed for a 1.25 Gbps data rate, so the OSCCLK and RCLK clock frequencies are commensurate at 1.25 GHz. The REFCLK frequency can be any frequency which, when multiplied by a preselected integer multiple, equals the desired OSCCLK frequency. Preferably, the preselected integer multiple ranges from 4 to 32. More preferably, a multiple of 10 is used as shown in FIG. 5. Circuit 68 provides division by the preselected integer multiple. The factor of 10 is conveniently used in implementations in which the incoming data is in the form of 10-bit words, so that REFCLK cycle corresponds to the receipt of one word that can be decoded using a suitable serial to parallel conversion circuit. It will be recognized that in other implementations, the REFCLK frequency could be chosen to equal the base data rate, in which case divisor circuit 68 would be eliminated. SMODE provides a switch by which the adaptive selection can be disabled for testing or during operation if desired.

Circuit 80 accepts an input data stream RX, which is sampled at three different delay times by Data Sampling Bank 82, thereby producing signals in three different delayed signal channels: nominally delayed intermediate signal channel NPATH (equivalent to DINDELAY of FIG. 2) and channels FPATH and TPATH that are respectively delayed by an early delay interval and a late delay interval.

Figure 6:
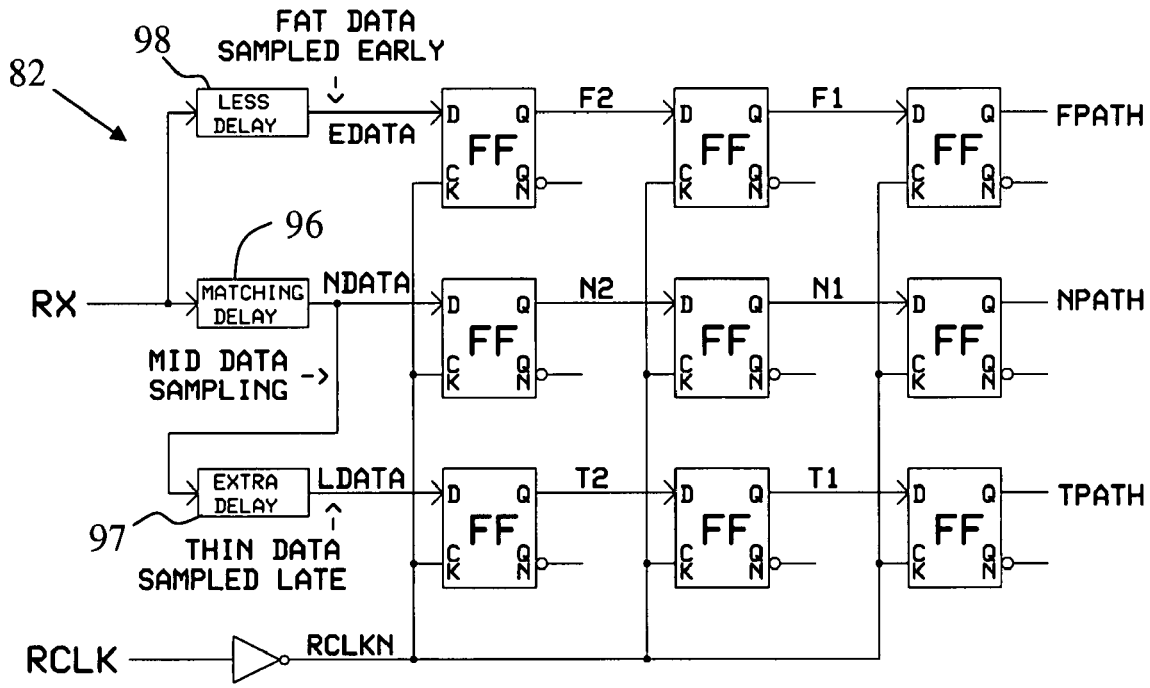
FIG. 6 is a block schematic diagram system depicting in more detail the data sampling circuit used in the FIG. 5 circuit.

One implementation of Data Sampling Bank 82 is provided by the circuit shown in FIG. 6. Input RX is concurrently processed through three paths to produce corresponding data streams with different amounts of delay. More specifically, a data stream NDATA is delayed by a nominal, intermediate delay 96 in channel NPATH, while data streams LDATA and EDATA are respectively delayed with greater and lesser delays 97, 98 in channels TPATH and FPATH. The three delays are typically provided by passing the signals through one or more suitable logic circuits which may be of any type known in the digital electronics art. It is preferred that the intermediate, early, and late delay intervals range from about 56 to 144%, about 81 to 169%, and about 31 to 119% of the time period corresponding to one bit at said data rate. Other similar delay intervals are suitable for implementations of the present circuit at other base data rates.

Figure 7:
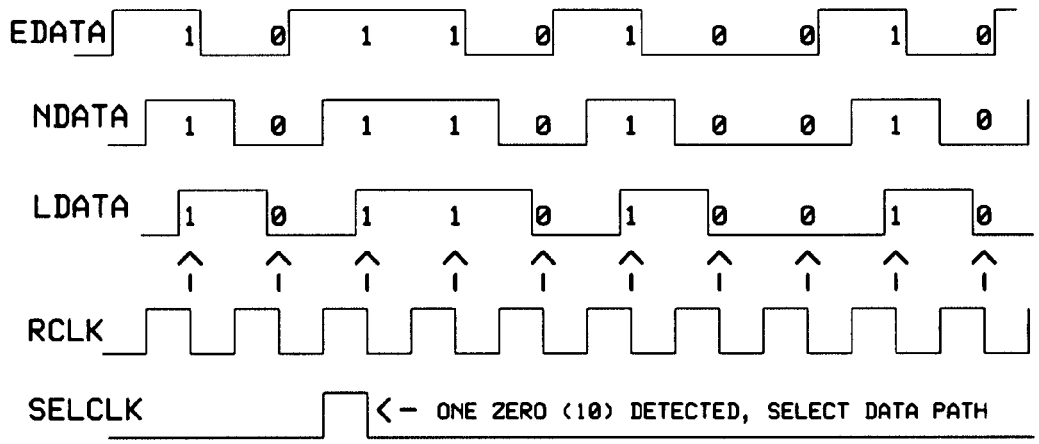
FIG. 7 is a timing diagram showing digital signals delayed by processing using the circuit of FIGS. 5-6.
Figure 8:
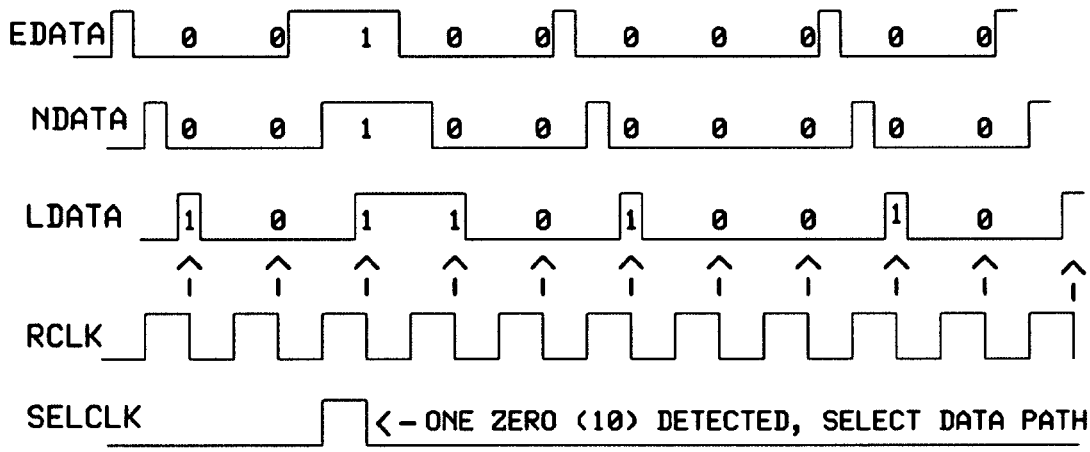
FIG. 8 is a timing diagram showing digital signals delayed by processing using the circuit of FIGS. 5-6.
Figure 9:
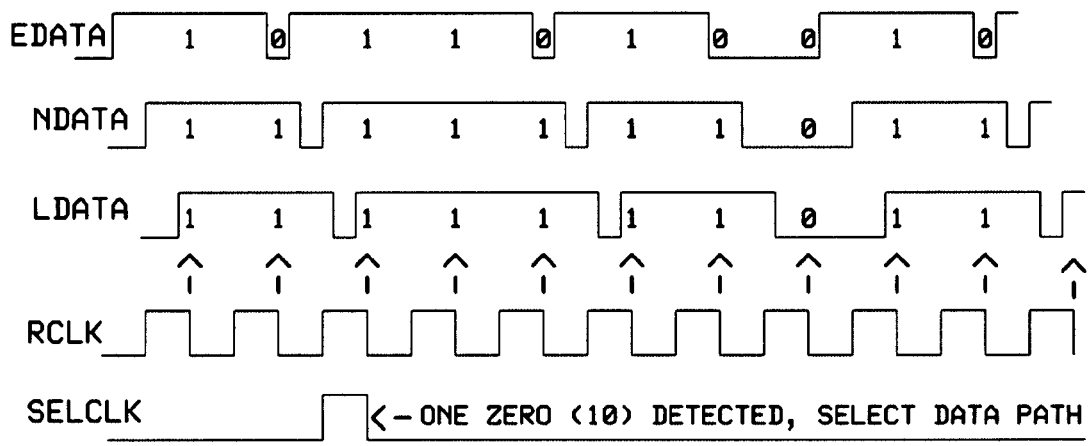
FIG. 9 is a timing diagram showing digital signals delayed by processing using the circuit of FIGS. 5-6.

FIGS. 7-9 depict the timing of the signals produced by Data Sampling Bank 82. Portions of a representative incoming stream are shown delayed signals EDATA, NDATA, and LDATA, respectively correspond to the signal channels FPATH, NPATH, or TPATH. All three signals are referenced to the timing of recovered clock RCLK. FIG. 7 illustrates the idealized situation (also shown FIG. 3) in which each of the bits, either 1 or 0, in the incoming RX signal occupies substantially the full interval established by the data rate. By way of contrast, FIGS. 8-9 depict the delayed signals resulting from an RX data stream bearing the same information as in FIG. 7, but with the data jittered, producing bits that are "thin" or "fat," respectively. The terms "thin" and "fat" are used herein refer to pulses that occupy a portion of the time interval appointed for each data bit that is narrower or broader than the normal interval dictated by the nominal data rate.

In the examples shown, which involve a 1.25 Gbps data rate, each bit nominally occupies an 800 ps time slice and the sampling times are referenced to the falling edges of RCLK. Sampling of the idealized signal of FIG. 7 is optimally done at the midpoint of each bit, that is to say, at a time triggered 400 ps after a rising edge, and at 800 ps intervals thereafter, as indicated by the arrows on the falling edges of RCLK. However, the same bit pattern (binary 1011010010) would result from sampling in any of the channels. On the other hand, FIG. 8 depicts the results of sampling done on very "thin" data, i.e. data in which a single bit, positive-going pulse lasts much less than 400 ps. It is apparent that sampling done in the intermediate channel, i.e. with triggering 400 ps after a rising edge, will incorrectly return certain bits. In particular, both intermediate and early channels will return a binary 0010000000, whereas the late channel will correctly return a binary 1011010010. A comparable problem arises with the "fat" pulses in FIG. 9, in which only the early signal channel returns the correct pattern, whereas the intermediate and late channels return binary 1111111011. Alternatively stated, the idealized data of FIG. 7 can be accurately sampled either at the nominal time (400 ps after the rising edge) or at the earlier or later times afforded by EDATA or LDATA. However, the thin data of FIG. 8 can be accurately sampled only in the LDATA channel and the fat data of in FIG. 9 can be accurately sampled only in the EDATA channel.

The delay selection circuit 80 of FIGS. 5-6 largely mitigates or eliminates errors stemming from inopportune timing of the sampling of jittered data, thereby accommodating both unjittered data and data with jitter ranging from thin to fat. In a 1.25 Gbps implementation, data as thin as 250 ps or as fat as 1350 ps can be reliably processed.

In the implementation of FIGS. 5-6, one of the delayed signals is selected by multiplexer MUX 86 in accordance with a delay select code, such as a bit pair (S1,S2) cooperatively determined by Select Logic circuit 88 and Pattern Detector 84, as further described below. In the implementation shown, selection means 89 comprises Select Logic circuit 88 and flip-flops 90, 92. The selected signal data stream is output from multiplexer 86 as SELPATH and then synchronized with the recovered clock RCLK using D-type flip-flop 94 to provide recovered data RDATA.

Select Logic circuit 88 continuously receives data processed from each path by Data Sampling Bank 82 in the following manner. With reference to FIG. 6, Data Sampling Bank 82 includes three channels, each having three D-type flip-flops sequentially connected in that path; all the flip-flops are triggered on the negation of RCLK. Each set of flip-flops thus acts as a shift register to retain a 2-bit sequence of the incoming RX data stream, as delayed in the respective signal channel. The bit stream includes two sequential bits in each path, respectively denominated as (N1,N2) in the nominal delay stream NDATA, (F1,F2) in the lesser delay stream EDATA, and (T1,T2) in the greater delay stream LDATA. These retained bits are all updated with each RCLK pulse. In the implementation shown, the greater delay used for LDATA is provided by sequential passage of the RX signal through matching delay 96 and extra delay 97. Other delay arrangements are possible. For example, the NDATA signal might be obtained by sequential passage of the RX signal through lesser delay 98 and then matching delay 96.

Figure 11:
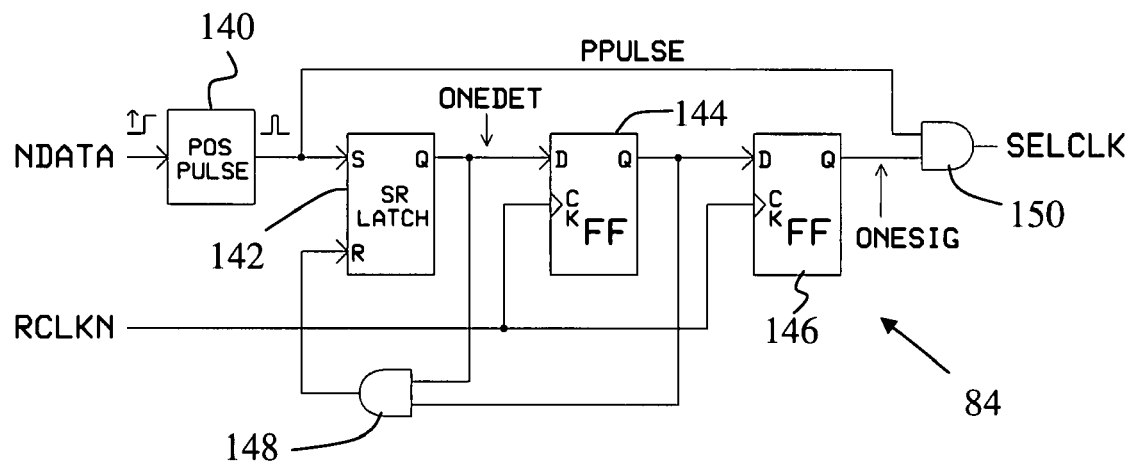
FIG. 11 is block schematic diagram depicting additional details of the pattern detection circuit incorporated in the FIG. 5 circuit.

One form of the pattern detect logic suitable for an implementation based on 0101 sequences in RX is provided by the circuit of FIG. 11. Other implementations are also possible, and it will be understood that the present system might also be implemented based on other preselected sequences by using suitable detection logic.

Figure 12:
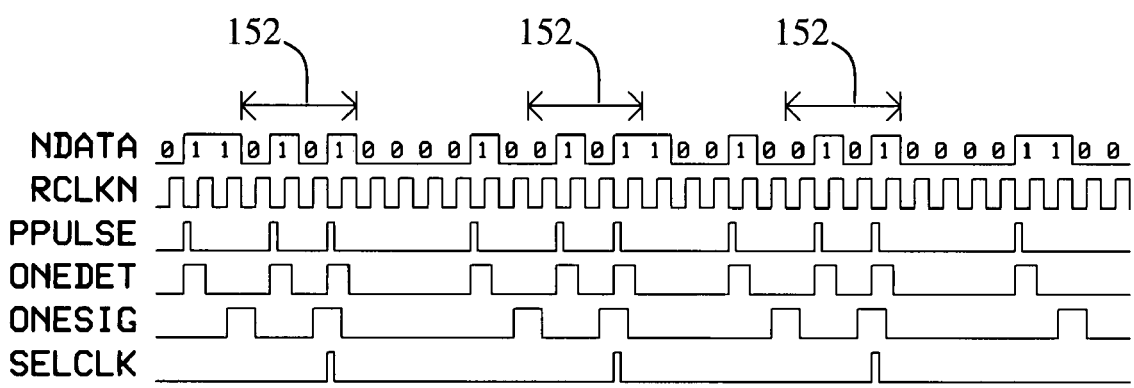
FIG. 12 is a timing diagram showing digital signals seen in the operation of the circuit of FIG. 11.

Referring now to FIG. 11, Pattern Detector 84 operates to sense the occurrence of a preselected low-high-low-high sequence in the incoming NRZ data stream and provide a pulse in the SELCLK channel in response. Preferably, the sequence is sensed in the NDATA data stream. The operation of Pattern Detector 84 is further revealed by the timing diagram of FIG. 12. Incoming data NDATA containing randomly-occurring low-high-low-high sequences 152 is fed to a monostable pulse generator 140 triggered to produce a pulse PPULSE on every 0→1 transition. The PPULSE duration is short relative to width of pulses in RCLK. SR Latch 142 latches on PPULSE to produce a corresponding ONEDET pulse, which is caused to have a duration of one RCLK clock cycle by the reset loop driven by AND gate 148. The shift register formed by sequential D-type flip-flops 144, 146 produces a one-cycle ONESIG pulse on the next rising clock edge after the occurrence of a binary 10 in the data stream. AND gate 150 senses coincidence of ONESIG and PPULSE, thereby producing a short pulse SELCLK indicative of detection of the binary sequence 0101 in the incoming data.

The generation of the SELCLK pulse in turn triggers updating of the delay select code. In the circuit of FIG. 5, the delay select code is specified by a bit pair denominated as (S1,S2), in accordance with Table I, wherein N, L, and E respectively denote the intermediate (nominal), late, and early signal channels.

TABLE I

Definition of Delay Select Codes by Bit Pair (S1, S2)

| S1 | S2 | Delay |
|---|---|---|
| X | 0 | N |
| 0 | 1 | L |
| 1 | 1 | E |

In particular, the SELCLK pulse triggers flip-flops 90 and 92, thereby causing the old (S1,S2) bit pair to be updated to values then being determined by Select Logic 88. The new (S1,S2) values encode the updated delay select code controlling MUX 86 until updating at the next occurrence of the preselected bit sequence.

In an implementation of the present method based on detection of an 0101 bit sequence in the incoming data stream, the updating of the delay select code is done based on the current delay select code, along with the first sample bit in the early signal channel (F1), and the second sample bit in the late signal channel (T2). The updating is done in accordance with the logic specified by Table II.

TABLE II

Logic Table for Updated Delay Select Code)

| F1 | T2 | Old Delay | New Delay |
|---|---|---|---|
| 0 | 0 | N | L |
| 0 | 0 | L | L |
| 0 | 0 | E | N |
| 1 | 1 | N | E |
| 1 | 1 | L | N |
| 1 | 1 | E | E |
| 1 | 0 | N | N |
| 1 | 0 | L | N |
| 1 | 0 | E | N |

It is found that the other possible combination (F1=0 and T2=1), although logically possible, does not arise in practice in coincidence with the detection of a 0101 sequence, except in the case of extremely large jitter beyond the limits of what the present circuit and method can reliably accommodate. As a result, updating of delay time in the F1=0/T2=1 instance ordinarily is not effectual.

Figure 10:
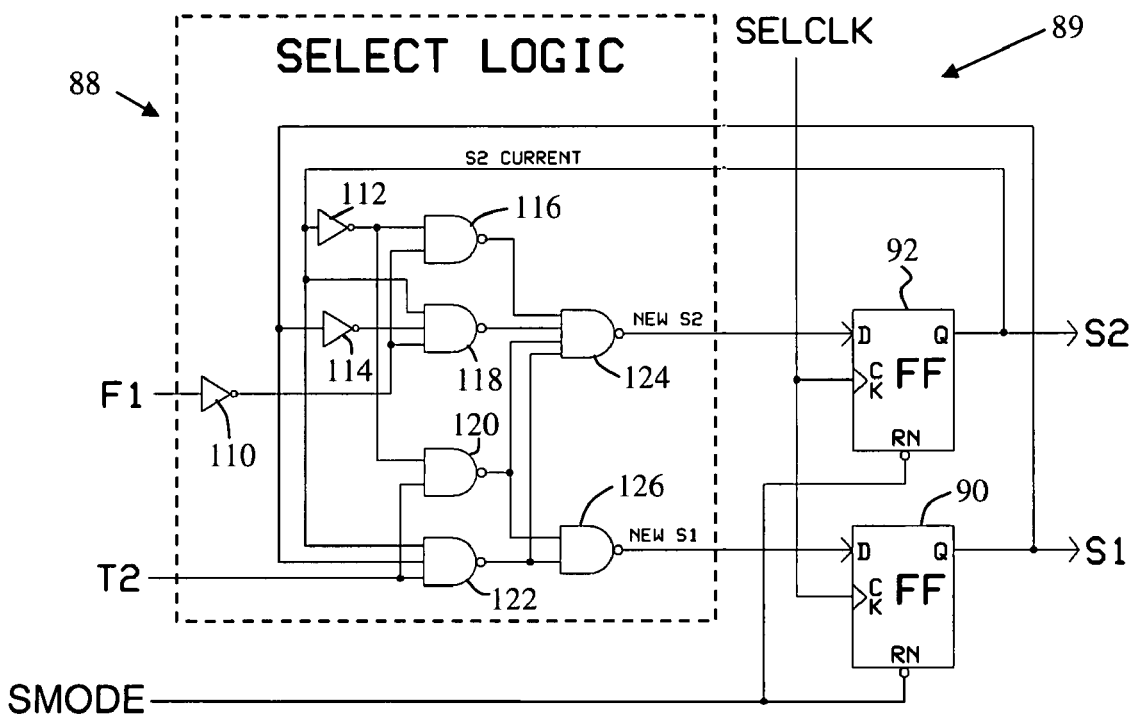
FIG. 10 is block schematic diagram depicting additional details of the select logic circuit incorporated in the FIG. 5 circuit.

With reference to FIG. 10, selection means 89, including Select Logic Circuit 88, operates in accordance with the full logic set forth in Table III below, with the possible cases being labeled as shown. Circuit 88 includes NOT gates (inverters) 110, 112 and 114. Circuit 88 includes NAND gates 116, 118, 120, 122, 124 and 126. Table III provides one possible implementation of the logic of Table II that is appropriate for the foregoing low-high-low-high (0101) preselected sequence. Circuit 88 thus determines algorithmically if selection of a different one of the delay times would improve the likelihood of accurate data recovery.

TABLE III (Logic Table for Select Logic 88)

| Case | F1 | T2 | Old S1 | Old S2 | Old Delay | New S1 | New S2 | New Delay |
|---|---|---|---|---|---|---|---|---|
| A | 0 | 0 | 0 | 0 | N | 0 | 1 | L |
| B | 0 | 0 | 0 | 1 | L | 0 | 1 | L |
| C | 0 | 0 | 1 | 0 | N | 0 | 1 | L |
| D | 0 | 0 | 1 | 1 | E | 0 | 0 | N |
| E | 0 | 1 | 0 | 0 | N | 1 | 1 | E |
| F | 0 | 1 | 0 | 1 | L | 0 | 1 | L |
| G | 0 | 1 | 1 | 0 | N | 1 | 1 | E |
| H | 0 | 1 | 1 | 1 | E | 1 | 1 | E |
| I | 1 | 0 | 0 | 0 | N | 0 | 0 | N |
| J | 1 | 0 | 0 | 1 | L | 0 | 0 | N |
| K | 1 | 0 | 1 | 0 | N | 0 | 0 | N |
| L | 1 | 0 | 1 | 1 | E | 0 | 0 | N |
| M | 1 | 1 | 0 | 0 | N | 1 | 1 | E |
| N | 1 | 1 | 0 | 1 | L | 0 | 0 | N |
| O | 1 | 1 | 1 | 0 | N | 1 | 1 | E |
| P | 1 | 1 | 1 | 1 | E | 1 | 1 | E |

More specifically, the functioning of Select Logic 88 in a preferred embodiment relies on the particular effect jitter has on the behavior of the F1 and T2 bits. As set forth above, these bits are retained at each RCLK cycle by Data Sampling Bank 82 from the FPATH and TPATH channels, respectively, and processed through Select Logic Circuit 88. The CDR circuit of FIGS. 5-6 is initially set to use the nominal delay of NPATH, but at every occurrence of the preselected 0101 sequence in the received data stream RX, the SELCLK pulse causes the optimum selection of delay from among NPATH, FPATH, and TPATH to be updated and maintained until the occurrence of the next preselected sequence. The initialization of the delay setting can be accomplished in any suitable way as indicated at 81. For example, a master reset can be applied during quiescent periods during which no data is being sent. Alternatively, a short header of data (preferably a 1010101010 sequence) that ensures availability of numerous bit patterns on which the present CDR circuit can operate may be included.

The current delay selection setting is encoded in (S1,S2) and the instantaneous values of the F1 and T2 bits are input to Select Logic circuit 88, which continuously calculates candidate new values of S1 and S2. Upon receipt of a SELCLK pulse signaling the presence of a binary "10" sequence in the RX data stream, D-type flip-flops 90, 92 update the current setting of S1 and S2 to the candidate values. The updated (S1,S2) data pair in turn drive the subsequent selection of a delayed signal channel by multiplexer MUX 86.

In particular, F1 represents the earliest possible detection of the first bit of a preselected, timing indication pattern having two timing indication bits, while T2 represents the latest possible detection of the second bit of the pattern. The F1 and T2 bits are tested at each occurrence of a SELCLK pulse indicating that the preselected sequence has come in the RX data stream. Under ideal, non-jittered conditions, two-bit sequences in any of the paths NPATH, TPATH, OR FPATH could be sampled at the SELCLK pulse and would yield the desired timing indication pattern, although NPATH is ordinarily selected. At any given triggering, detection of a "10" in all three paths indicates NPATH is optimal. If NPATH is already selected, it remains so (Cases I, K); TPATH is switched to NPATH (Cases J, N); FPATH is switched to NPATH (Cases D, L). If the data pulses begin to grow thinner, then fat path bit F1 will first fail to detect a "1" in coincidence with a binary "10" detection, indicating warrant for a switch from nominal path NPATH to the thin path TPATH (Cases A, C). On the other hand, if the data grow fatter, the thin path bit T2 will be the first to fail to detect a "0" in coincidence with a "10" detection, initiating a switch from nominal path NPATH to the fat path FPATH (Cases M, O).

Still referring to Table III, Cases H, P are situations in which selection of fat path FPATH remains optimal as long as bit T2 remains a "1." Thereafter, a thinning of formerly fat data pulses is first signaled by a detection of a "0" in T2 in coincidence with a binary "10" pattern, initiating a switch from FPATH to normal path NPATH (Cases D, L). On the other hand, continuing selection of thin path TPATH remains optimal as long as bit F1 remains a "0" (Cases B, F). A widening of formerly thin data pulses is first signaled by a detection of a "1" in F1 in coincidence with a binary "10" pattern, initiating a switch from thin path TPATH to NPATH (Cases J, N). Although implemented in the logic of circuit 88, cases E and G ordinarily do not arise in actual data, absent anomalously large jitter.

Preferably, any change to the optimal delay time is initiated only at the occurrence of a SELCLK pulse and is thus made seamlessly. That is to say, no bit error is produced in recovered data as a result of the change in delayed signal channel.

Other implementations of the selection means might rely on some more or all of bit pairs (F1,F2), (N1,N2), and (T1,T2) in the incoming data streams.

The present system is preferably implemented for processing data encoded in 8B10B format. Generally stated, 8B10B is an encoding that maps 8-bit symbols onto 10-bit symbols to achieve DC-balance and bounded disparity. The redundancy afforded by the extra two bits assures that state changes occur with sufficient frequency to facilitate clock recovery. In particular, the encoding insures that there are just as many "1"s as "0"s in a string of two 10-bit symbols, and that there are not too many sequential "1"s or "0"s. As a result, level transitions (1→0 and 0→1) and certain data patterns, notably including bit patterns with four alternating bits (i.e., "0101" and "1010") occur frequently. One implementation of 8B10B encoding is provided by U.S. Pat. No. 4,486,739 to Franaszek et al., which is incorporated herein in the entirety by reference thereto.

It will be understood that the present circuit and method may also be used in conjunction with other forms of binary data encoding. Preferably an encoding is used that results in frequent occurrence of particular bit patterns. More preferably, a pattern having a sequence of single alternating bits is frequent. A particularly preferred pattern that provides one implementation of the present method is a binary "0101" sequence. It will be understood that by inverting the logic, the present method and circuit could be implemented similarly based on a "1010" sequence. More preferably, a "0101" sequence occurs frequently in the data stream. For example each binary "0101" sequence includes the aforementioned "10" pattern with a preceding "0" and a trailing "1." In a preferred implementation, the frequent occurrence of such binary "10" patterns permits the optimal delay time to be ascertained and updated rapidly in response to changing jitter.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A circuit for recovering clock and data signals from an NRZ digital input signal carried in a digital communications system, the input signal having a data rate, and the circuit comprising:
    a clock means for generating a recovered clock signal having a recovered clock frequency synchronized to said data rate;
    initialization means for setting a delay select code signifying a delay interval of one of an intermediate, early, or late delay interval, said initialization means setting said delay select code to a preselected one of said delay intervals at the startup of said circuit;
    a data sampling bank receiving said NRZ digital input signal and triggered by said recovered clock, the bank comprising:
        i. early, intermediate, and late signal channels;
        ii. an intermediate delay means for delaying said NRZ digital input signal by said intermediate delay interval to form an intermediate delayed signal in said intermediate signal channel;
        iii. an early delay means for delaying said NRZ digital input signal by said early delay interval to form an early delayed signal in said early signal channel, said early delay interval being less than said intermediate delay interval; and
        iv. a late delay means for delaying said NRZ digital input signal by said late delay interval to form an late delayed signal in said late signal channel, said late delay interval being greater than said intermediate delay interval;
    a pattern detection means for detecting occurrences of a preselected bit pattern in said intermediate delayed signal, said preselected bit pattern consisting of a sequence of a preselected initial bit, a preselected multi-bit timing indication pattern having an indication number of bits, and a preselected final bit, and said pattern detection means generating a select pulse in response to each detection of said preselected bit pattern;
    a selection means connected to said pattern detection means and said data sampling bank, and operative in response to each receipt of said select pulse to update said delay select code;
    a multiplexer receiving said delay select code from said selection means and signals from said data sampling bank in said early, intermediate, and late signal channels, said multiplexer outputting an optimum delayed signal chosen from the signals in said early, intermediate, and late signal channels, according to said delay select code; and
    an output flip-flop receiving said optimum delayed signal from said multiplexer and being clocked by said recovered clock signal, said output flip-flop thereby forming said recovered data signal in synchrony with said recovered clock signal; and
    wherein said updating of said delay select code preserves said preselected bit pattern in said recovered data signal.

2. A circuit as recited by claim 1, wherein said circuit is implemented as a CMOS integrated circuit.

3. A circuit as recited by claim 1, wherein said circuit is adapted to receive a local clock signal having a local clock frequency and said clock means comprises:
    a reference clock circuit comprising a voltage-controlled reference oscillator generating a reference oscillator frequency stabilized by a phase-lock loop that provides a bias signal controlling said voltage-controlled reference oscillator, said phase-lock loop causing said bias signal to be controlled such that said reference oscillator frequency is locked to said local clock frequency and is substantially equal to said recovered clock frequency.

4. A circuit as recited by claim 3, wherein said reference oscillator frequency is a preselected integer multiple of said local clock frequency and said phase lock loop: comprises a divider circuit that divides said reference oscillator frequency by said integral multiple to provide a divided reference frequency and locks said divided reference frequency to said local clock frequency.

5. A circuit as recited by claim 4, wherein said preselected integer multiple ranges from about 4 to 32.

6. A circuit as recited by claim 5, wherein said preselected integer multiple is 10.

7. A circuit as recited by claim 3, wherein said clock means further comprises:
    a divide-by-2 circuit receiving said NRZ digital input signal and outputting complementary divided first and second phase signals;
    a first voltage-controlled data oscillator having a frequency controlled by said bias signal and said first phase signal to produce a first phase clock signal;
    a second voltage-controlled data oscillator having a frequency controlled by said bias signal and said second phase signal to produce a second phase clock signal; and an OR logic circuit receiving said first and second phase clock signals, said OR logic circuit producing said recovered clock signal by OR'ing said first and second phase clock signals.

8. A circuit as recited by claim 7, wherein said voltage-controlled reference oscillator and said first and second voltage-controlled data oscillators are substantially matched.

9. A circuit as recited by claim 1, wherein said input data rate is about 1.25 Gbps.

10. A circuit as recited by claim 1, wherein said preselected bit pattern consists of four alternating bits.

11. A circuit as recited by claim 10, wherein said preselected bit pattern is a 0101 pattern.

12. A circuit as recited by claim 10, wherein:
said data sampling bank comprises a shift register in each of said signal channels, each of said shift registers being triggered at each cycle of said recovered clock to retain a sequence of at least a first and a second sample bit in said signal channel preceding said triggering.

13. A circuit as recited by claim 12, wherein:
said selection means comprises a select logic circuit and a selection updating circuit;
said select logic circuit receives as select logic input said delay select code and at least said first sample bit in said early signal channel and said second sample bit in said late signal channel, and algorithmically determines a new delay select code from said select logic input; and
said selection updating circuit receives said new delay select code and causes said delay select code to be updated to said new delay select code upon receipt of said select pulse.

14. A circuit as recited by claim 13, wherein said delay select code is specified by a plurality of bits and said selection updating circuit comprises a select flip-flop for each bit of said delay select code, said flip-flops being clocked by said select pulse.

15. A circuit as recited by claim 13, wherein said new delay select code is determined from said select logic input in accordance with the following logic table, wherein F1 is said first sample bit in said early signal channel, T2 is said second sample bit in said late signal channel, and N, E, and L are delay select codes corresponding to said intermediate, early, and late signal channels:

| F1 | T2 | Old Delay | New Delay |
|---|---|---|---|
| 0 | 0 | N | L |
| 0 | 0 | L | L |
| 0 | 0 | E | N |
| 1 | 1 | N | E |
| 1 | 1 | L | N |
| 1 | 1 | E | E |
| 1 | 0 | N | N |
| 1 | 0 | L | N |
| 1 | 0 | E | N. |

16. A method for recovering clock and data signals from an NRZ digital input signal carried in a digital communications system, the input signal having a data rate, and the method comprising:
providing a recovered clock signal having a recovered clock frequency synchronized to said data rate;
defining a delay select code signifying a delay interval of one of an intermediate, early, or late delay interval and initializing said delay select code of a preselected one of said delay intervals at the startup of said method;
delaying said input signal by said intermediate delay interval to form an intermediate delayed signal;
delaying said input signal by said early delay interval to form an early delayed signal, said early delay interval being less than said intermediate delay interval;
delaying said input signal by said late delay interval to form a late delayed signal, said late delay interval being greater than said intermediate delay interval;
detecting in one of said delayed signals occurrences of a preselected bit pattern consisting of a sequence of a preselected initial bit, a preselected multi-bit timing indication pattern having an indication number of bits, and a preselected final bit;
selecting from among said early, intermediate, and late delayed signals an optimum delayed signal, said selection being chosen according to said delay select code; and
retiming said optimum delayed signal to form said recovered data signal in synchrony with said recovered clock signal,
wherein said selecting preserves said preselected bit pattern in said recovered data signal.

17. A method as recited by claim 16, wherein said NRZ digital input signal is encoded using 8B10B encoding.

18. A method as recited by claim 16, wherein said preselected bit pattern consists of four alternating bits.

19. A method as recited by claim 18, wherein said preselected bit pattern is a 0101 pattern.

20. A method as recited by claim 16, further comprising:
initializing said selecting of said optimum delayed signal to be a preselected one of said early, intermediate, and late delayed signals.

21. A method as recited by claim 18, further comprising retaining a sequence of at least a first and a second sample bit in each of said intermediate, early, and late delayed signals preceding each cycle of said recovered clock.

22. A method as recited by claim 21, further comprising generating a select pulse in response to each detection of said preselected bit pattern, and wherein at each occurrence of said select pulse said delay select code is algorithmically updated to a new delay select code based on a select logic input comprising a present value of said delay select code and said first sample bit in said early signal channel and said second sample bit in said late signal channel.

23. A method as recited by claim 22, wherein said new delay select code is determined from said select logic input in accordance with the following logic table, wherein F1 is said first sample bit in said early signal channel, T2 is said second sample bit in said late signal channel, and N, E, and L are delay select codes corresponding to said intermediate, early, and late signal channels:

| F1 | T2 | Old Delay | New Delay |
|---|---|---|---|
| 0 | 0 | N | L |
| 0 | 0 | L | L |
| 0 | 0 | E | N |
| 1 | 1 | N | E |
| 1 | 1 | L | N |
| 1 | 1 | E | E |
| 1 | 0 | N | N |
| 1 | 0 | L | N |
| 1 | 0 | E | N. |

* * * * *